United States Patent [19]

Graves

[11] Patent Number: 5,333,384
[45] Date of Patent: Aug. 2, 1994

[54] NUTCRACKER

[76] Inventor: Gerald E. Graves, 3650 Silverside Rd., Box 1, Wilmington, Del. 19810

[21] Appl. No.: 144,246

[22] Filed: Nov. 1, 1993

[51] Int. Cl.⁵ .............................................. A47J 43/26
[52] U.S. Cl. ..................................... 30/120.2; 99/571
[58] Field of Search ................ 30/120.1, 120.2, 120.5; 99/568, 571, 572, 580

[56] References Cited

U.S. PATENT DOCUMENTS

| | | | |
|---|---|---|---|
| 3,524,486 | 8/1970 | Turner | 99/580 |
| 3,713,468 | 1/1973 | Walsh | 99/580 |
| 3,841,212 | 10/1974 | Powell | 99/571 |
| 4,255,855 | 3/1981 | Brazil | 30/120.5 |
| 4,831,733 | 5/1989 | Morrow | 30/120.2 |
| 5,092,231 | 3/1992 | Smith | 99/572 |

Primary Examiner—Richard K. Seidel
Assistant Examiner—Hwei-Sin Payer
Attorney, Agent, or Firm—Charles S. Knothe

[57] ABSTRACT

A manual nutcracker which includes a spring loaded ram which impacts a plunger with limited travel and strikes the nut shell in an enclosed chamber and shatters the shell without damaging the nut itself.

1 Claim, 1 Drawing Sheet

NUTCRACKER

BACKGROUND OF INVENTION

This invention relates to a manual nut cracking device. Numerous nut cracking devices have been developed in the past, which can not control the limit of crushing force, so the nut meat as well as the shells are crushed. Others have limits for crushing but are not easily adjusted for different size nuts. This invention discloses a nut cracker which does not crush the nut while breaking the shell. This invention by quickly impacting the nut and limiting the travel of the plunger shatters the shell of the nut without damaging the nut itself.

SUMMARY OF INVENTION

This invention discloses a nutcracker with a base rail with two ends, a top and bottom and two sides. A stop block is affixed to one end of the base rail on the bottom side which engages the edge of the surface upon which the base rail is rested. Two ram guides with two ends are mounted to the top and sides of the base rail corresponding to one another at the end of the base rail opposite the end which the stop block is affixed. Each ram guide contains a way and the two ways face each other.

A ram with top and bottom, and two sides interacts with the ways in the two ram guides. A handle is attached to the top side of the ram.

A plunger block is mounted to the top side of the base rail between the two ram guides and the end of the base rail with the stop block. The plunger block contains a hole through the entire plunger block which is parallel to the base rail.

A hook is attached to the bottom side of the ram and a fixed hood is mounted to the top of base rail between the ram guides at the end of the ram guides closest to the plunger block. A biasing means with two ends connects with one end attached to the hook on the ram and the other end attached to the fixed hook.

The plunger has a head at one end, a face at the other end and shaft between the head and face. The diameter of the head and face are greater than the diameter of the shaft and the shaft interacts with the hole in the plunger block. The length of the shaft is greater than the length of the hole in the plunger block, such that the plunger can not be removed from the plunger block but can move longitudinally along the shaft within the hole in the plunger block;

A pair of tongues are formed longtitudinally into each side of the base rail from the end of the base rail with the stop block to where the plunger block is mounted to the base rail.

The chamber housing with grooves which interact with the tongues on the base rail sides along the base rail from the end of the stop block to the plunger block. The chamber housing contains a cracking chamber which slides within the chamber housing and is biased by an anti-crushing spring such that it is biased toward at the end of the chamber housing which is closest to the plunger block.

DETAILED DESCRIPTION OF THE DRAWING

Figure 1:
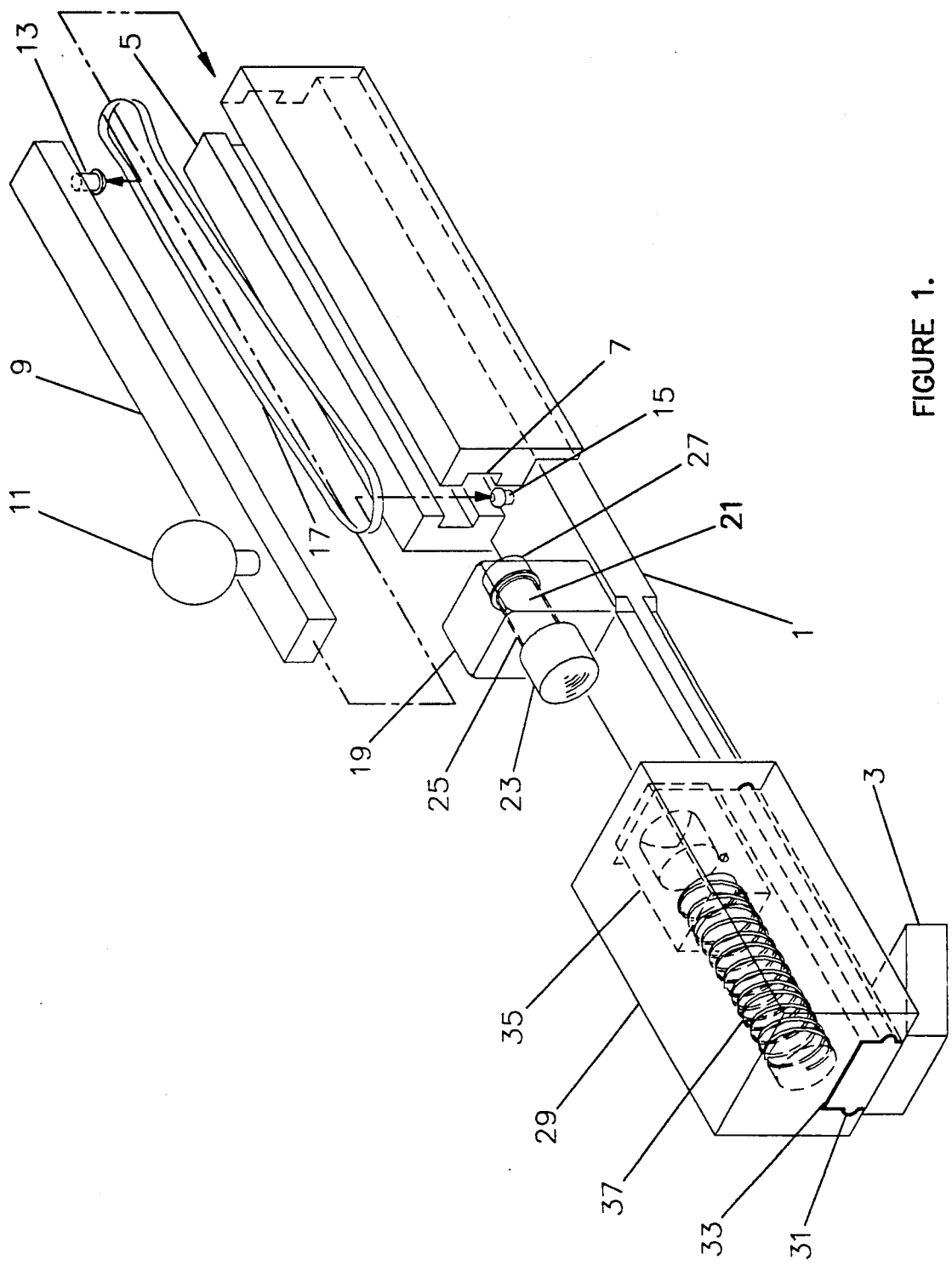
FIG. 1 is a exploded perspective of the device.

In FIG. 1 the stop block 3 is attached to the one end of the base rail 1. The stop block is positioned over the edge of the surface upon which the nut cracker is placed to stop the device from moving during its use. At the other end of the base rail 1 are two ram guides 5 which are mounted to the top and sides of the base rail 1. Each ram guide 5 has a way 7 along its longitudinal length. The ram guides 5 are mounted such that the ways 7 face one another.

Inserted in the ways 7 is the ram 9. The ram 9 has a handle 11 which allows the user to move the ram within the ways 7. The ram is biased by the biasing means 17. In the preferred embodiment the biasing means 17 is a rubber band. One end of the biasing means is attached to the fixed hook 15 and the other end to the hook 13 which is attached to the ram 9.

FIG. 1 also shows the plunger 21 with a head 27 at one end, a face 23 at the other end and shaft 25 between the head 27 and face 23. The diameter of the head 27 and face 23 are greater than the diameter of the shaft 25. The shaft 25 interacts with the hole in the plunger block 19 and the length of the shaft 25 is greater than the length of the hole in the plunger block. Therefore the plunger can not be removed from the plunger block but can move longitudinally along the shaft within the hole in the plunger block 19.

A pair of tongues 31 are shown in FIG. 1 along the longitudinal sides of the side of the base rail from the end of the base rail with the stop block to where the plunger block is mounted to the base rail.

The figure also depicts the chamber housing 29 with grooves 33 which interact with the tongues 31 on the base rail 1 such that the chamber housing 29 slides along the base rail 1 from the end of the stop block 3 to the plunger block 19. The chamber housing 29 contains a cracking chamber 35 which slides within the chamber housing 29 and is biased by an anti-crushing spring 37 such that it is biased toward at the end of the chamber housing 29 which is closest to the plunger block 19.

The nut desired to be cracked is placed in the cracking chamber 35. The chamber housing 29 is slid along the base rail 1 towards the plunger block 19 until the nut contacts the plunger face 23. Because the chamber housing 29 slides along the base rail 1 nuts of various sizes can have their shell broken. The user then draws the ram 9 back by the handle 11 within the ram guides 5 and stretches the biasing device 17 which is connected to the fixed hook 15 and the hook 13 on the ram 9. The stop block 3 stops the nut cracker from moving. When the ram is pulled back a sufficient distance which the user will determine from experience, the handle 11 is released. The biasing device 17 quickly propels the ram 9 forward which impacts the plunger head 27. The plunger moves within the plunger block 19 but the movement of the plunger is restricted to the difference between the length of the plunger shaft 25 and the thickness of the plunger block 19. Therefore the shell on the nut is shattered but the nut is not crushed. Because the nut is with the cracking chamber 35 the particles of the shell are contained. The cushion spring 37 allows the cracking chamber to recoil during impact so the nut is not crushed.

I claim:

1. A manual nutcracker comprising:
   a base rail having two ends, a top, a bottom and two sides;
   a stop block affixed to one end of said bottom;
   two ram guides having two ends which are mounted to the top and sides of the base rail corresponding to one another at the end of the base rail opposite the end on which the stop block is affixed, each ram guide contains a way and the two ways face each other;

a ram having top and bottom, and two sides, said sides interact with the ways in the two ram guides;

a handle attached to the top of the ram;

a plunger block mounted to the top of the base rail between the two ram guides and the end of the base rail where the stop block is affixed, said plunger block contains a hole therethrough which is parallel to the base rail;

a hook attached to the bottom of the ram;

a fixed hook mounted to the top of base rail between the ram guides at the end of the ram guides closest to the plunger block;

a biasing means having two ends with one end attached to the hook on the ram and the other end attached to the fixed hook;

a plunger having a head at one end, a face at the other end and a shaft between the head and the face, the head and the face each having a diameter greater than the diameter of the shaft, the shaft interacts acts with the hole in the plunger block, and the length of the shaft is greater than the length of the hole in the plunger block, such that the plunger can not be removed from the plunger block but can move longitudinally within the hole in the plunger block;

a pair of tongues are formed longitudinally into each side of the base rail from the end of the base rail with the stop block to where the plunger block is mounted to the base rail;

a chamber housing having grooves which interact with the tongues on the base rail such that the chamber housing slides along the base rail from the end with the stop block to the plunger block, the chamber housing contains a cracking chamber which slides within the chamber housing and is biased by an anti-crushing spring such that it is biased toward the end of the chamber housing which is closest to the plunger block.

* * * * *